US009918057B2

(12) United States Patent
Monaghan et al.

(10) Patent No.: US 9,918,057 B2
(45) Date of Patent: Mar. 13, 2018

(54) PROJECTING TEXT CHARACTERS ONTO A TEXTURED SURFACE

(71) Applicant: CANON KABUSHIKI KAISHA, Tokyo (JP)

(72) Inventors: David Robert James Monaghan, Elanora Heights (AU); Belinda Margaret Yee, Balmain (AU); Rajanish Calisa, Artarmon (AU)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/280,882

(22) Filed: Sep. 29, 2016

(65) Prior Publication Data

US 2017/0094235 A1    Mar. 30, 2017

(30) Foreign Application Priority Data

Sep. 30, 2015    (AU) .................................. 2015234303

(51) Int. Cl.
*H04N 9/31*    (2006.01)
*G06T 11/60*    (2006.01)
*G06K 9/00*    (2006.01)

(52) U.S. Cl.
CPC ............. *H04N 9/3179* (2013.01); *G06K 9/00* (2013.01); *G06T 11/60* (2013.01); *H04N 9/3194* (2013.01)

(58) Field of Classification Search
CPC ...... H04N 9/3179; H04N 9/3194; G06K 9/00; G06T 11/60
See application file for complete search history.

(56) References Cited

U.S. PATENT DOCUMENTS

| 2002/0180752 A1* | 12/2002 | Chernega ............... H04N 7/181 |
| | | 345/589 |
| 2003/0035591 A1 | 2/2003 | Crabtree et al. |
| 2013/0153651 A1* | 6/2013 | Fedorovskaya ...... G06K 9/2036 |
| | | 235/375 |

OTHER PUBLICATIONS

Lauren F.V. Scharff et al., "Predicting the readability of transparent text", Journal of Vision, 2002, 2, pp. 653-666.
W. Bradford Paley; "Designing Better Transparent Overlays by Applying Illustration Techniques and Vision Filings", Digital Image Design Incorporated and Columbia University, New York, NY, USA, Jan. 2003.

* cited by examiner

*Primary Examiner* — Michael Teitelbaum
(74) *Attorney, Agent, or Firm* — Canon USA, Inc. I.P. Division

(57) ABSTRACT

A method, apparatus and system of projecting text characters onto a textured document are described. The method comprises determining, from a captured image of the textured surface, a measure of the texture on the surface for a region of the textured surface over which the text characters are to be projected; selecting, based on a function of the determined measure, a glyph set, each glyph in the glyph set having visually contrasting inner and outer portions, the outer portion being sized proportionally to the inner portion according to the determined measure; and projecting the text characters onto the textured surface on of region using the selected glyph set.

18 Claims, 16 Drawing Sheets

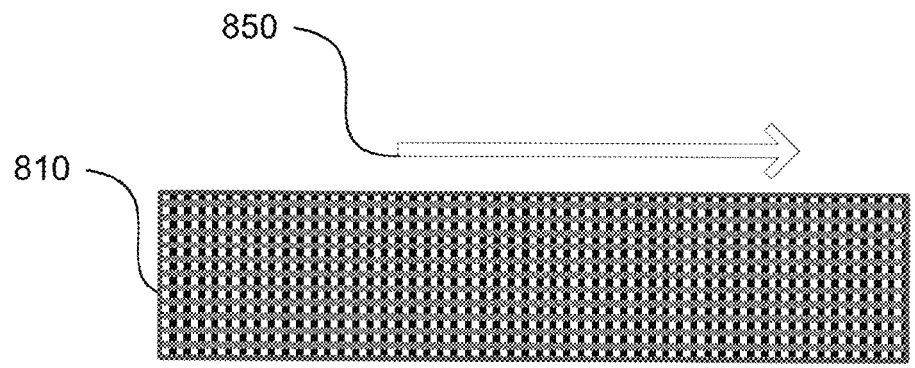
Fig. 8A
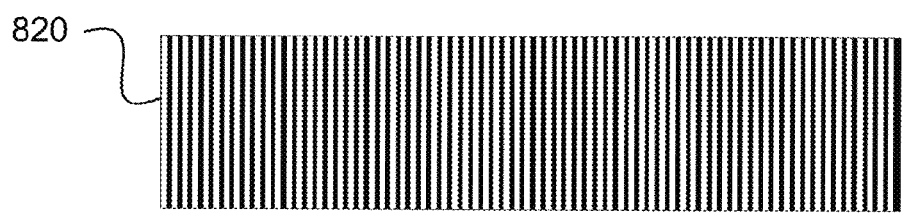
Fig. 8B
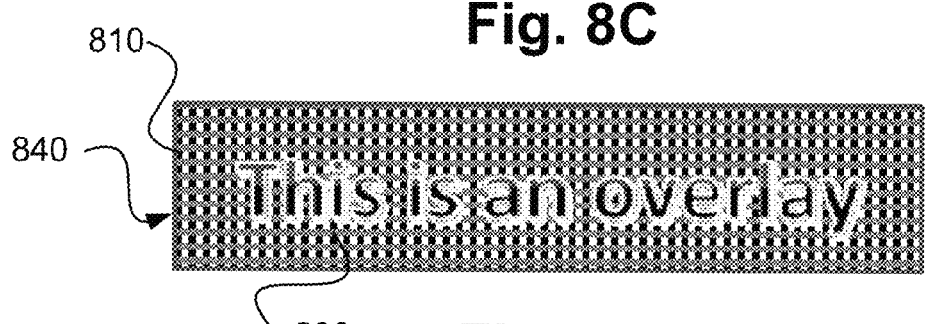
Fig. 8C
Fig. 8D

PROJECTING TEXT CHARACTERS ONTO A TEXTURED SURFACE

REFERENCE TO RELATED PATENT APPLICATION(S)

This application claims the benefit under 35 U.S.C. § 119 of the filing date of Australian Patent Application No. 2015234303, filed 30 Sep. 2015, hereby incorporated by reference in its entirety as if fully set forth herein.

TECHNICAL FIELD

The present disclosure relates to projection of information in augmentable areas on a surface. In particular, the present disclosure relates to a method, system and apparatus of projecting text characters onto a textured surface. The present disclosure further relates to a computer readable medium storing instructions executable to implement a method of projecting text characters on to a textured surface.

BACKGROUND

Augmented reality is a view of a physical world where some elements of physical reality are augmented by computer generated inputs such as sound, graphics and so on. Users are able to use hand-held and wearable devices to retrieve additional information related to a captured image of a real world object from a camera connected to the device (for example, a camera phone or a camera attached to a head-mounted display or augmented reality glasses) and augment the additional information to the real world object. Such a real-world object may be a natural image in a document, a piece of textual information, a physical object such as a printer and so on.

In addition to hand-held devices, projectors are also being used to show augmented reality information, particularly in office environments. For example, projectors in conjunction with a camera are being used to provide an augmented reality system. A projection based augmented reality system provides hands-free and glasses-free augmented reality to the end-user.

When projection-based augmented reality systems are used to project information in environments such as an office employee's desk, suitable areas for projection may be difficult to find, or even unavailable. Such occurs because a typical desk in an office environment presents a cluttered background for projection with a variety of objects such as cups, printed documents, a keyboard, a mouse and the like. Hence, information may often need to be projected on busy backgrounds such as a printed text document or textured surfaces. In such instances, a challenge for the projection based augmented reality system is to ensure legibility of projected information. Such is particularly challenging if the projected information is textual content to be projected over or against a wide variety of complex background textures. This challenge occurs as the projected information cannot be completely opaque, and projection can only illuminate surfaces rather than hide the surfaces. Such is often particularly apparent when the projected information is textual in nature and is being projected on a surface that already contains texture. In such an event, the texture of the surface can be a distraction to the end-user. The texture may reduce the extent to which the projected text stands out, thus failing to provide a fulfilling experience to the user.

A need exists for a method of projecting textual information on a textured surface, such as a printed surface which already has printed text, such that legibility of the projected text is maintained while mitigating the distracting effects of the printed background text.

SUMMARY

The present disclosure describes exemplary embodiments to substantially overcome, or at least ameliorate, at least one disadvantage of present arrangements.

A first aspect of the present disclosure provides a method of projecting text characters onto a textured surface, the method comprising: determining, from a captured image of the textured surface, a measure of the texture on the surface for a region of the textured surface over which the text characters are to be projected; selecting, based on a function of the determined measure, a glyph set, each glyph in the glyph set having visually contrasting inner and outer portions, the outer portion being sized proportionally to the inner portion according to the determined measure; and projecting the text characters onto the textured surface of the region using the selected glyph set.

In another implementation, the function of the determined measure is a spatial frequency, the spatial frequency relating to a distribution of at least one dominant repeating pattern of the texture.

In another implementation, the textured surface comprises a printed text surface, and the spatial frequency relates to a distribution of a most frequently occurring character size of the printed text.

In another implementation, the textured surface comprises a barcode, and the spatial frequency relates to an average width of stripes of the barcode.

In another implementation, the inner and outer portions form contrasting sharp edges in the projected text characters.

In another implementation, the inner portion and outer portion of the selected font form contrasting sharp edges in the projected text characters, the sharp edges having a dominant repeating pattern similar to the spatial frequency.

In another implementation, the inner text portion and the outer text portion comprise at least one of a contrasting colour and a contrasting pattern.

In another implementation, the measure is determined based upon a Fourier transform of the texture.

In another implementation, the function of the determined measure relates to a dominant frequency determined from the Fourier transform.

In another implementation, the measure of the texture is determined in two mutually perpendicular directions.

In another implementation, a width of at least one of the inner and outer portions of the selected set of glyphs is varied according the determined measure in each of the directions.

In another implementation, the texture has a different orientation to an orientation of the projected text, the measure being determined in relation to the orientation of the texture.

In another implementation, the function of the determined measure is translated from the orientation of the texture to the orientation of the projected text for selection of the glyph set.

In another implementation, at least one of the inner portion and the outer portion comprises an animation pattern.

In another implementation, the pattern is varied proportionally to the function of the determined measure.

In another implementation, the pattern is varied inversely proportionally to the function of the determined measure.

In another implementation, the pattern simulates movement in a direction of flow of the projected text.

A further aspect of the present disclosure provides a computer readable medium having a computer program stored thereon for projecting text characters onto a textured surface, the computer program comprising: code for determining, from a captured image of the textured surface, a measure of the texture on the surface for a region of the textured surface over which the text characters are to be projected; code for selecting, based on a function of the determined measure, a glyph set, each glyph in the glyph set having visually contrasting inner and outer portions, the outer portion being sized relative to the inner portion based upon the determined measure; and code for projecting the text characters onto the textured surface of the region using the selected glyph set.

Another aspect of the present disclosure provides a system for projecting text characters onto a textured surface, the system comprising: a memory for storing data and a computer program; a processor coupled to the memory for executing said computer program, said computer program comprising instructions for: determining, from a captured image of the textured surface, a measure of the texture on the surface for a region of the textured surface over which the text characters are to be projected; selecting, based on a function of the determined measure, a glyph set, each glyph in the glyph set having visually contrasting inner and outer portions, the outer portion being sized in relation to the inner portion according to the determined measure; and projecting the text characters onto the textured surface of the region using the selected glyph set.

Another aspect of the present disclosure provides an apparatus for projecting text characters onto a textured surface, the apparatus comprising: means for determining, from a captured image of the textured surface, a measure of the texture on the surface for a region of the textured surface over which the text characters are to be projected; means for selecting, based on a function of the determined measure, a glyph set, each glyph in the glyph set having visually contrasting inner and outer portions, the outer portion being sized proportionally to the inner portion based upon a function of the determined measure; and means for projecting the text characters onto the textured surface of the region using the selected glyph set.

BRIEF DESCRIPTION OF THE DRAWINGS

One or more embodiments will now be described with reference to the following drawings, in which:

FIGS. 8A to 8D show estimation of spatial frequency of a textured surface;

DETAILED DESCRIPTION

Figure 1A:
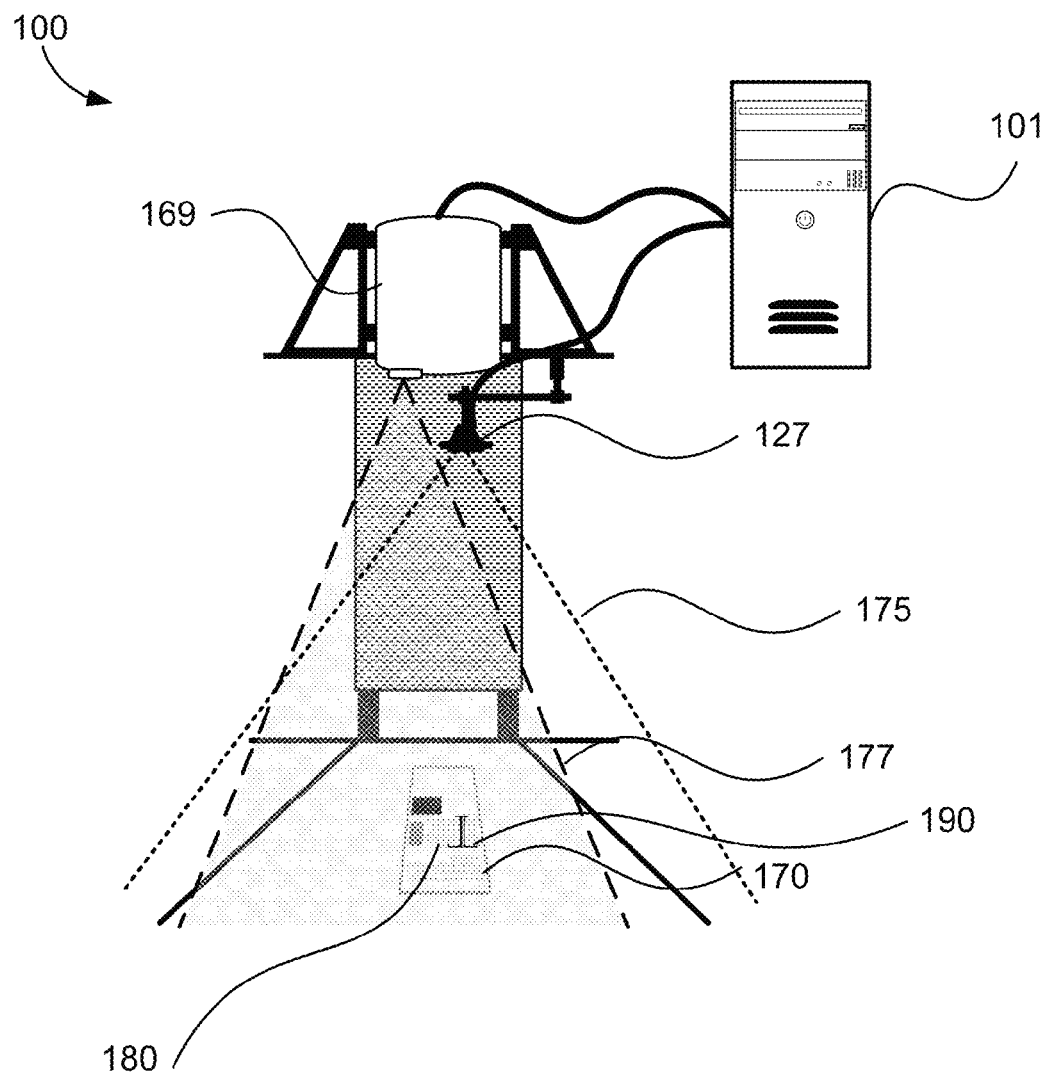
FIGS. 1A, 1B and 1C form a schematic block diagram of a system upon which arrangements described can be practiced.

Where reference is made in any one or more of the accompanying drawings to steps and/or features, which have the same reference numerals, those steps and/or features have for the purposes of this description the same function(s) or operation(s), unless the contrary intention appears.

The present disclosure relates to data representation technologies. In particular, the present disclosure relates to a system and method for providing enhanced legibility and readability of textual augmented reality content when the augmented reality content is projected on a complex background (such as a text document or a textured background with fine detail) by making the background less distracting through use of texture suppression.

The arrangements described relate to projection of text onto a textured surface. In the context of this description, a textured surface relates to a surface upon which texture in form of visually detectable variations is present. Examples of textured surfaces include surfaces relating to printed text (for example, a printed documents), bar codes and any surface comprising visual variations whether formed by variations in colour on the surface (for example a pattern, a photograph, a poster or a colour diagram), or physical variations on the surface causing visual variations (for example a brick surface, presence of protrusions or recesses on a surface, and the like).

In the description herein, a textured surface upon which text characters are to be projected may be referred to as a background texture or overlaid texture. The projected text characters may be referred to as foreground text.

Some methods of projecting text use transparent overlays. Designers of transparent overlays use colour variations and font style variations (e.g. bold, size of font) to separate or distinguish foreground text from background texture such as background text. Such methods may be effective when the foreground text is carefully placed in between spaces between lines of background text. However, such methods often fail to provide a satisfactory solution when text is projected on top of a textured surface, such as background text.

Other methods effectively hide background texture on an image by distributing luminance of projected text pixels to surrounding image pixels. Such methods have an effect that, at large distances, the background texture is not distracting to the user when looking at the image. At a short distance, the background texture is visible for the end-user to read. Such methods may suppress background texture of an image. However, such methods cannot be applied to projection based augmented reality systems as precise control of the luminance of pixels surrounding the projected text characters cannot be achieved.

The arrangements described relate to projecting text using a glyph set including glyphs having visually contrasting inner and outer portions. The visual contrast of the inner and outer portions is judged subjectively by a human eye. The visually contrasting inner and outer portions are selected to mask the background texture which is to be projected onto. For example, the inner and outer portions may form visually contrasting sharp edges. The contrasting edges may have a spatial frequency equivalent to the textured surface, and can act to mask the background texture. A spatial frequency of the background texture is analysed and the font or glyph set of the projected text selected to ensure that the projected text is legible, stands out and, when projected on a textures background, effectively masks the texture.

FIG. 1A shows a projection-based augmented reality system 100 upon which the arrangements described may be practiced. The projection-based augmented reality system 100 includes a projector 169 used to present information related to physical objects in a scene. The projector 169 may be any projecting device suitable for projecting information using light onto a surface such as a wall, a screen, and the like. The scene is captured by an image capture device 127. The image capture device, in this instance a camera, may be any other device suitable for capturing an image, such as a video camera, or a communications device including an image capture device, such as a smartphone.

The system 100 includes a computer module 101 in communication with the projector 169 and the camera 127. The computer module 101 may be in wired or wireless communication with the projector 169. Similarly, the computer module 101 may be in wired or wireless communication with the camera 127. In some implementations, the camera 127 and/or the projector 169 may be integral to the computer module 101. The camera 127 retrieves a raster image of a camera field of view 175 and transmits the raster image to the computer module 101. The projector 169 receives digital data from the computer module 101 and projects digital data 190 on to a specified location 180 in a field of projection 177 of the projector 169. The specified location 180 typically refers to a contiguous region of texture within a textured surface, in this example a printed document 170. The specified location 180 of the projected digital data 190 is typically specified by the computer module 101.

In the system of FIG. 1A, the field of projection 177 is different to the camera field of view 175. In other arrangements, the field of projection 177 may be identical to the camera field of view 175.

Figure 1B:
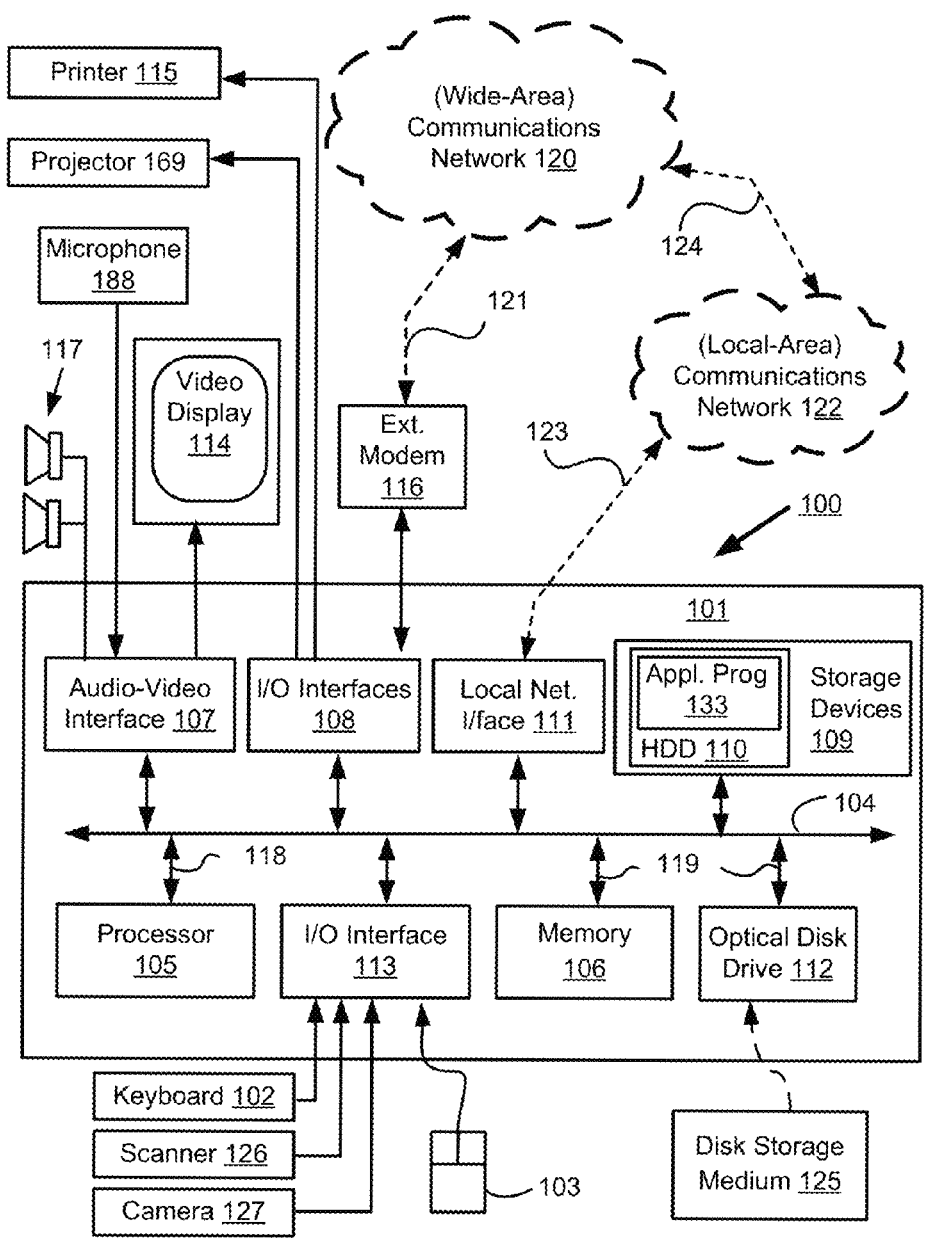
Figure 1C:
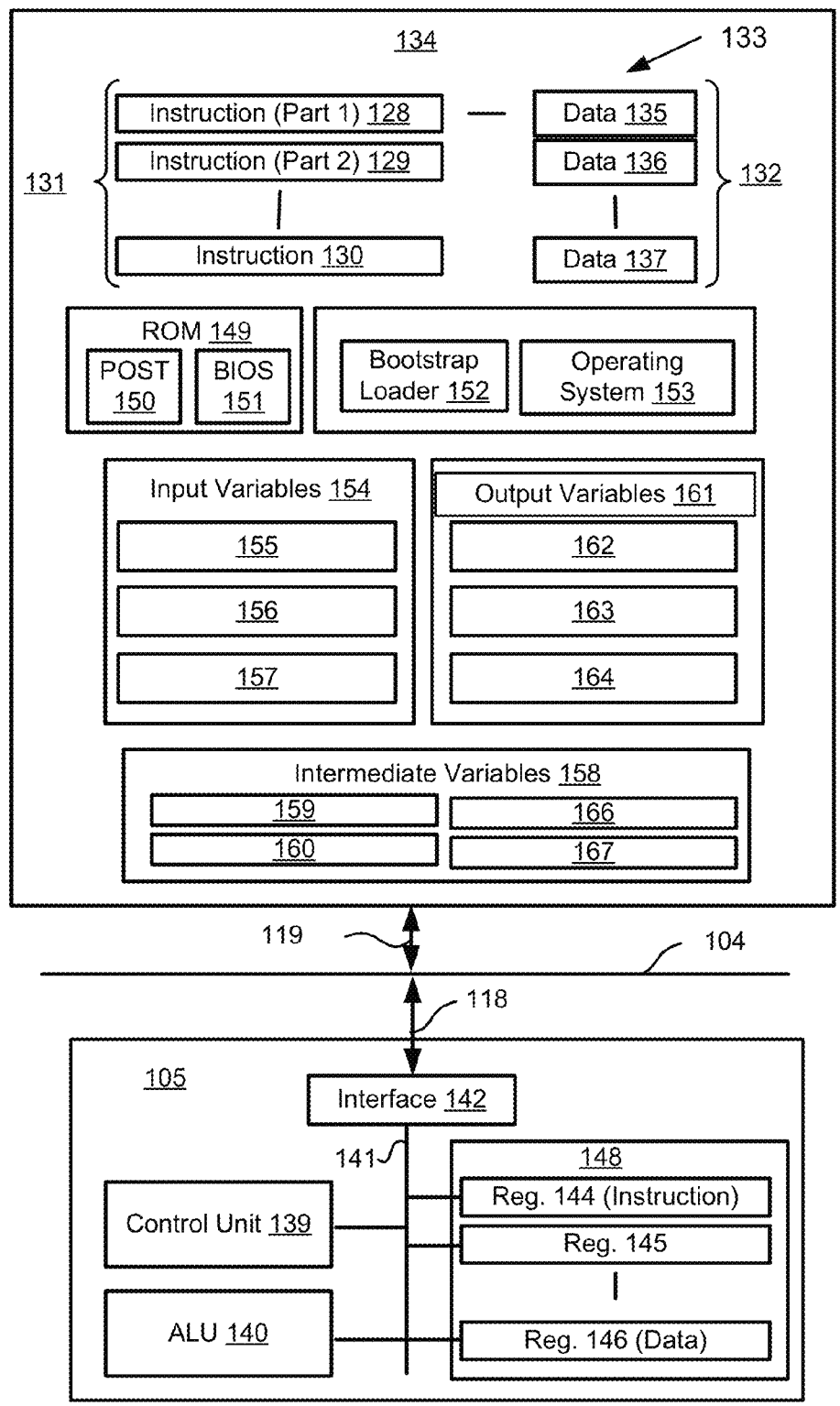

FIGS. 1B and 1C show the computer module 101 in more detail.

As seen in FIG. 1B, the system 100 includes: the computer module 101; input devices such as a keyboard 102, a mouse pointer device 103, a scanner 126, the camera 127, and a microphone 188; and output devices including the projector 169, a printer 115, a display device 114 and loudspeakers 117. An external Modulator-Demodulator (Modem) transceiver device 116 may be used by the computer module 101 for communicating to and from a communications network 120 via a connection 121. The communications network 120 may be a wide-area network (WAN), such as the Internet, a cellular telecommunications network, or a private WAN. Where the connection 121 is a telephone line, the modem 116 may be a traditional "dial-up" modem. Alternatively, where the connection 121 is a high capacity (e.g., cable) connection, the modem 116 may be a broadband modem. A wireless modem may also be used for wireless connection to the communications network 120.

The computer module 101 typically includes at least one processor unit 105, and a memory unit 106. For example, the memory unit 106 may have semiconductor random access memory (RAM) and semiconductor read only memory (ROM). The computer module 101 also includes an number of input/output (I/O) interfaces including: an audio-video interface 107 that couples to the video display 114, loudspeakers 117 and microphone 188, an I/O interface 113 that couples to the keyboard 102, mouse 103, scanner 126, camera 127 and optionally a joystick or other human interface device (not illustrated); and an interface 108 for the external modem 116, projector 169 and printer 115. In some implementations, the modem 116 may be incorporated within the computer module 101, for example within the interface 108. The computer module 101 also has a local network interface 111, which permits coupling of the computer system 100 via a connection 123 to a local-area communications network 122, known as a Local Area Network (LAN). As illustrated in FIG. 1B, the local communications network 122 may also couple to the wide network 120 via a connection 124, which would typically include a so-called "firewall" device or device of similar functionality. The local network interface 111 may comprise an Ethernet circuit card, a Bluetooth® wireless arrangement or an IEEE 802.11 wireless arrangement; however, numerous other types of interfaces may be practiced for the interface 111.

The I/O interfaces 108 and 113 may afford either or both of serial and parallel connectivity, the former typically being implemented according to the Universal Serial Bus (USB) standards and having corresponding USB connectors (not illustrated). Storage devices 109 are provided and typically include a hard disk drive (HDD) 110. Other storage devices such as a floppy disk drive and a magnetic tape drive (not illustrated) may also be used. An optical disk drive 112 is typically provided to act as a non-volatile source of data. Portable memory devices, such optical disks (e.g., CD-ROM, DVD, Blu-Ray Disc™), USB-RAM, portable, external hard drives, and floppy disks, for example, may be used as appropriate sources of data to the system 100.

The components 105 to 113 of the computer module 101 typically communicate via an interconnected bus 104 and in a manner that results in a conventional mode of operation of the computer system 100 known to those in the relevant art. For example, the processor 105 is coupled to the system bus 104 using a connection 118. Likewise, the memory 106 and optical disk drive 112 are coupled to the system bus 104 by connections 119. Examples of computers on which the described arrangements can be practised include IBM-PC's and compatibles, Sun Sparcstations, Apple Mac™ or like computer systems.

Figure 2:
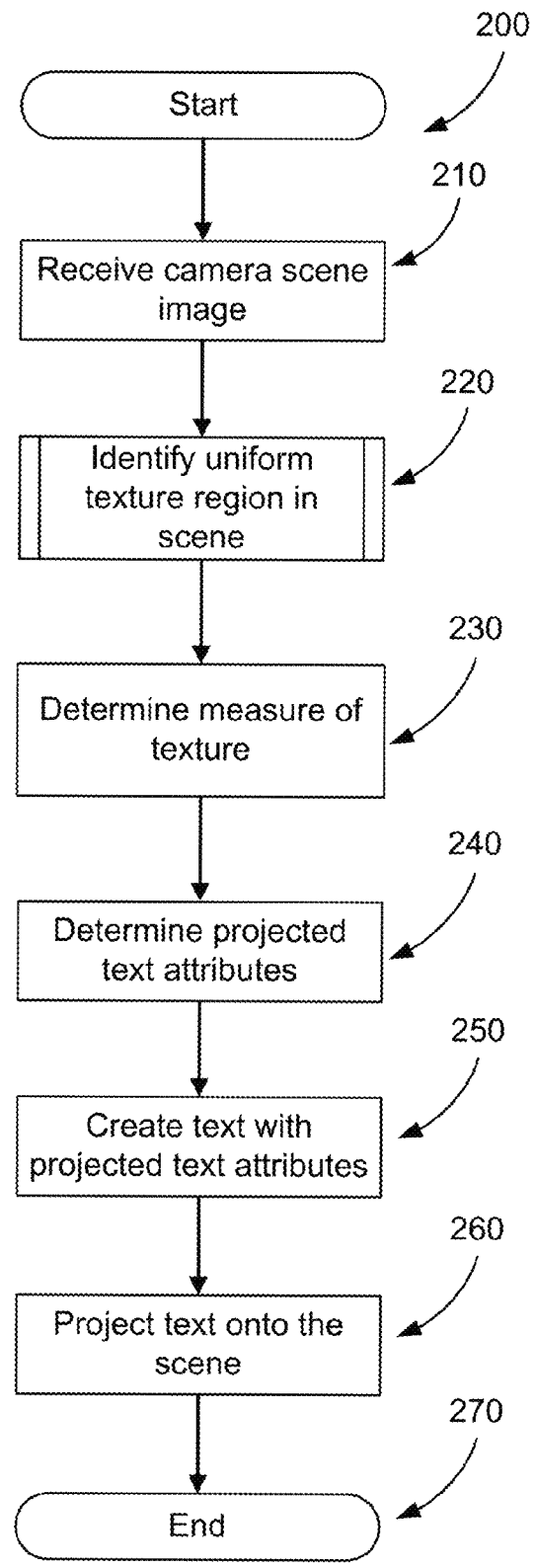
FIG. 2 shows a schematic flow diagram for a method of projecting text characters on to a textured surface.
Figure 3:
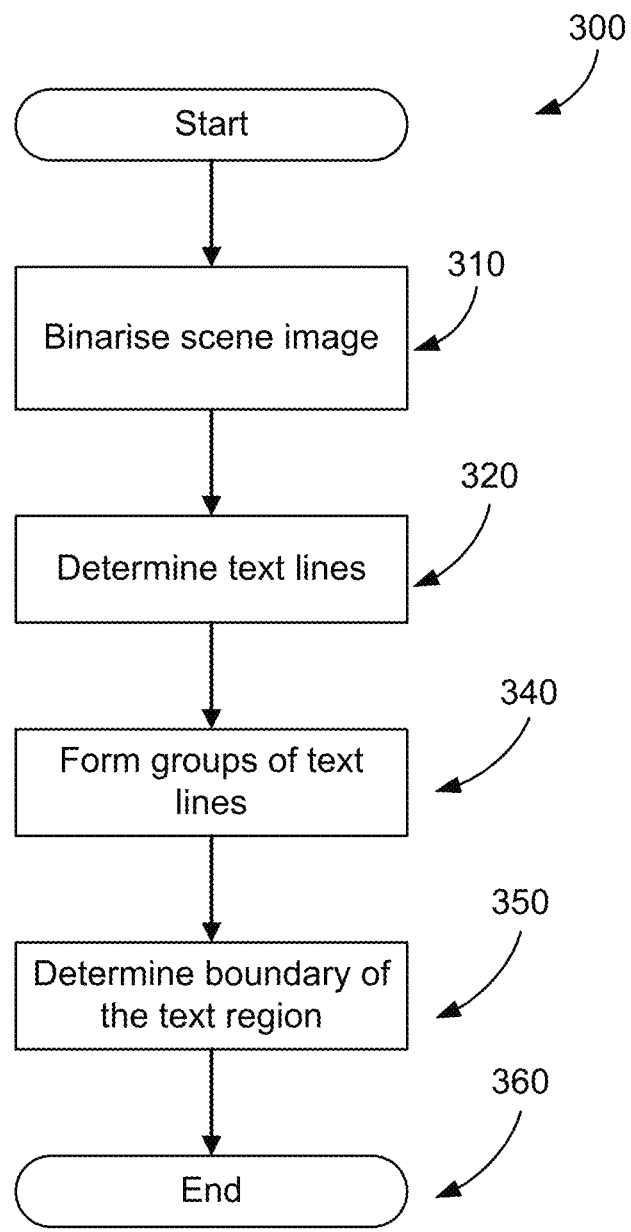
FIG. 3 is a schematic flow diagram showing a method of identifying a uniform text region in a printed document.

The method of projecting test characters on to a printed text document may be implemented using the computer system 100 wherein the processes of FIGS. 2 and 3, to be described, may be implemented as one or more software application programs 133 executable within the computer system 100. In particular, the steps of the method of projecting test characters on to a printed text document are effected by instructions 131 (see FIG. 1C) in the software 133 that are carried out within the computer system 100. The software instructions 131 may be formed as one or more code modules, each for performing one or more particular tasks. The software may also be divided into two separate parts, in which a first part and the corresponding code modules performs the described methods and a second part and the corresponding code modules manage a user interface between the first part and the user.

The software may be stored in a computer readable medium, including the storage devices described below, for example. The software 133 is typically stored in the HDD 110 or the memory 106. The software is loaded into the computer system 100 from the computer readable medium, and then executed by the computer system 100. A computer readable medium having such software or computer program recorded on the computer readable medium is a computer program product. The use of the computer program product in the computer system 100 preferably effects an advantageous apparatus for projecting test characters on to a printed text document.

Thus, for example, the software 133 may be stored on an optically readable disk storage medium (e.g., CD-ROM) 125 that is read by the optical disk drive 112. A computer readable medium having such software or computer program recorded on it is a computer program product. The use of the computer program product in the computer system 100 preferably effects an apparatus or a means for projecting test characters on to a printed text document.

In some instances, the application programs 133 may be supplied to the user encoded on one or more CD-ROMs 125 and read via the corresponding drive 112, or alternatively may be read by the user from the networks 120 or 122. Still further, the software can also be loaded into the computer system 100 from other computer readable media. Computer readable storage media refers to any non-transitory tangible storage medium that provides recorded instructions and/or data to the computer system 100 for execution and/or processing. Examples of such storage media include floppy disks, magnetic tape, CD-ROM, DVD, Blu-Ray™ Disc, a hard disk drive, a ROM or integrated circuit, USB memory, a magneto-optical disk, or a computer readable card such as a PCMCIA card and the like, whether or not such devices are internal or external of the computer module 101. Examples of transitory or non-tangible computer readable transmission media that may also participate in the provision of software, application programs, instructions and/or data to the computer module 101 include radio or infra-red transmission channels as well as a network connection to another computer or networked device, and the Internet or Intranets including e-mail transmissions and information recorded on Websites and the like.

The second part of the application programs 133 and the corresponding code modules mentioned above may be executed to implement one or more graphical user interfaces (GUIs) to be rendered or otherwise represented upon the display 114. Through manipulation of typically the keyboard 102 and the mouse 103, a user of the computer system 100 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 117 and user voice commands input via the microphone 188.

FIG. 1C is a detailed schematic block diagram of the processor 105 and a "memory" 134. The memory 134 represents a logical aggregation of all the memory modules (including the HDD 109 and semiconductor memory 106) that can be accessed by the computer module 101 in FIG. 1B.

When the computer module 101 is initially powered up, a power-on self-test (POST) program 150 executes. The POST program 150 is typically stored in a ROM 149 of the semiconductor memory 106 of FIG. 1B. A hardware device such as the ROM 149 storing software is sometimes referred to as firmware. The POST program 150 examines hardware within the computer module 101 to ensure proper functioning and typically checks the processor 105, the memory 134 (109, 106), and a basic input-output systems software (BIOS) module 151, also typically stored in the ROM 149, for correct operation. Once the POST program 150 has run successfully, the BIOS 151 activates the hard disk drive 110 of FIG. 1B. Activation of the hard disk drive 110 causes a bootstrap loader program 152 that is resident on the hard disk drive 110 to execute via the processor 105. This loads an operating system 153 into the RAM memory 106, upon which the operating system 153 commences operation. The operating system 153 is a system level application, executable by the processor 105, to fulfil various high level functions, including processor management, memory management, device management, storage management, software application interface, and generic user interface.

The operating system 153 manages the memory 134 (109, 106) to ensure that each process or application running on the computer module 101 has sufficient memory in which to execute without colliding with memory allocated to another process. Furthermore, the different types of memory available in the system 100 of FIG. 1B must be used properly so that each process can run effectively. Accordingly, the aggregated memory 134 is not intended to illustrate how particular segments of memory are allocated (unless otherwise stated), but rather to provide a general view of the memory accessible by the computer system 100 and how such is used.

As shown in FIG. 1C, the processor 105 includes a number of functional modules including a control unit 139, an arithmetic logic unit (ALU) 140, and a local or internal memory 148, sometimes called a cache memory. The cache memory 148 typically includes a number of storage registers 144-146 in a register section. One or more internal busses 141 functionally interconnect these functional modules. The processor 105 typically also has one or more interfaces 142 for communicating with external devices via the system bus 104, using a connection 118. The memory 134 is coupled to the bus 104 using a connection 119.

The application program 133 includes a sequence of instructions 131 that may include conditional branch and loop instructions. The program 133 may also include data 132 which is used in execution of the program 133. The instructions 131 and the data 132 are stored in memory locations 128, 129, 130 and 135, 136, 137, respectively. Depending upon the relative size of the instructions 131 and the memory locations 128-130, a particular instruction may be stored in a single memory location as depicted by the instruction shown in the memory location 130. Alternately, an instruction may be segmented into a number of parts each of which is stored in a separate memory location, as depicted by the instruction segments shown in the memory locations 128 and 129.

In general, the processor 105 is given a set of instructions which are executed therein. The processor 105 waits for a subsequent input, to which the processor 105 reacts to by executing another set of instructions. Each input may be provided from one or more of a number of sources, including data generated by one or more of the input devices 102, 103, data received from an external source across one of the networks 120, 122, data retrieved from one of the storage devices 106, 109 or data retrieved from a storage medium 125 inserted into the corresponding reader 112, all depicted in FIG. 1B. The execution of a set of the instructions may in some cases result in output of data. Execution may also involve storing data or variables to the memory 134.

The described arrangements use input variables 154, which are stored in the memory 134 in corresponding memory locations 155, 156, 157. The described arrangements produce output variables 161, which are stored in the memory 134 in corresponding memory locations 162, 163, 164. Intermediate variables 158 may be stored in memory locations 159, 160, 166 and 167.

Referring to the processor 105 of FIG. 1C, the registers 144, 145, 146, the arithmetic logic unit (ALU) 140, and the control unit 139 work together to perform sequences of micro-operations needed to perform "fetch, decode, and execute" cycles for every instruction in the instruction set making up the program 133. Each fetch, decode, and execute cycle comprises:

a fetch operation, which fetches or reads an instruction 131 from a memory location 128, 129, 130;

a decode operation in which the control unit 139 determines which instruction has been fetched; and an execute operation in which the control unit 139 and/or the ALU 140 execute the instruction.

Thereafter, a further fetch, decode, and execute cycle for the next instruction may be executed. Similarly, a store cycle may be performed by which the control unit 139 stores or writes a value to a memory location 132.

Each step or sub-process in the processes of FIGS. 2 and 3 is associated with one or more segments of the program 133 and is performed by the register section 144, 145, 147, the ALU 140, and the control unit 139 in the processor 105 working together to perform the fetch, decode, and execute cycles for every instruction in the instruction set for the noted segments of the program 133.

FIG. 2 shows a method 200 of projecting text characters onto a textured surface. The method 200 may be referred to as a text projection method. In the example provided in relation to FIG. 2, the textured surface comprises printed text document, the document 170.

The text projection method 200 is implemented as one or more submodules of the application 133, stored in the memory 106 and controlled by execution of the processor 105.

The text projection method 200 commences with execution of step 210. In execution of the step 210, an image corresponding to a scene of the camera field of view 175 is captured by the camera 127. The captured image is received by the computer module 101 from the camera 127.

The method 200 executes on the processor 105 to progress from step 210 to step 220. At step 220 the application 133 executes to process the captured image to determine a position of the printed document 170 in the received image, and a region of uniform texture in the captured image. In the example of FIG. 2, the region of uniform texture is a region of uniform text. In the arrangements described herein, the region of uniform text is determined by execution of the method 200, and the region of uniform text corresponds to the specified region 180. In other arrangements, the specified region may be pre-defined, for example according to an instruction input by a user to the computer module 101. In such arrangements, the step 220 may be excluded (not shown). A method 300 of identifying a region of uniform text in the scene, as executed at step 220, is now described in detail in relation to FIG. 3.

The method 300 is implemented as one or more submodules of the application 133, stored in the memory 106 and controlled by execution of the processor 105. The method 300 of FIG. 3 commences with execution of step 310 on the processor 105. In execution of the step 310, the captured image of the text document in the scene is binarized or colour quantised. The binarization process results in the image of the document being converted into black and white pixels with the text characters represented by black pixels (for example binary 0) and the non-textual background represented by white pixels (for example binary 1).

The method 300 executes to progress from step 310 to step 320. At step 320, the application 133 executes to determine lines of text on the binarized input. The step 320 executes to use a technique known in the art, such as "Constrained Run-Length Algorithm" (CRLA), also known as "Run-length Smearing", to detect lines of text in the binarized input. In other arrangements, connected component analysis may be performed on the binarized or colour quantised image in execution of step 320 to identify each character or a word as a connected-component. In other arrangements, a distance between characters and words may be used to determine a direction of the text lines in execution of step 320. Typically, thresholds which are either pre-determined or determined by statistical analysis are used to group words and characters into text lines. In other arrangements of step 320, methods such as plotting a histogram of distances and angles of the nearest-neighbours of connected components may also be used to determine thresholds for merging connected components into text lines. In further arrangements, the received document image is rotated to a dominant text orientation. In such arrangements, text lines are formed which are mostly horizontal and a vanishing point of the mostly horizontal text lines can then be calculated to correct for perspective.

The method 300 executes on the processor 105 to proceed from step 320 to step 340. At step 340, the application 133 executes on the processor 105 to merge the text lines detected at step 320 to form groups of text lines. In execution of step 340, distance between text lines as well as length of text lines may be used to group lines together. In some arrangements, statistically determined thresholds or pre-determined thresholds may be used to determine if two adjacent text lines are part of the same group or not.

The method 300 executes on the processor 105 to proceed from step 340 to step 350. At step 350, the application 133 executes to determine a boundary or a perimeter around the contiguous group of text lines formed in step 340. Execution of the step 350 determines the boundary of the group of text lines by observing that the boundary is made up of white pixels with at least one black pixel that is 4-connected to the boundary. In other arrangements, connected component analysis of such boundary pixels may be used to determine a boundary around the uniform region of text lines. In alternative arrangements, a smallest bounding box or a polygon that encloses all text lines in a group can be determined. In some arrangements, the specified location 180 may include the uniform text region within the boundary and a further region adjacent to or surrounding the uniform text region. The method 300 executes on the processor 105 to proceed from step 350 to step 360. At step 360, the process 300 ends.

The method 300 is described above in relation to a textual surface. Similar methods may be used to determine a uniform region of a textured (non-textual) surface such as binarizing the image, determining lines or area of a pattern in the image, and determining a boundary in the textured surface.

Referring back to FIG. 2, the method 200 executes on the processor 105 to proceed from step 220 to step 230. At step 230, the application 133 executes on the processor 105 to determine a measure of the texture of the surface in the uniform texture region over which text characters are to be projected. The measure may relate to a size of one or more patterns or variations in texture in the region. In the example of FIG. 2, the measure of the texture relates to a measure of the text characters in the uniform text region (as identified in step 220) referred to by the specified location 180 of the document 170. In arrangements which do not include step 220, step 230 executes to determine characteristics of a predetermined region, such as a region specified by the user.

Figure 7A:
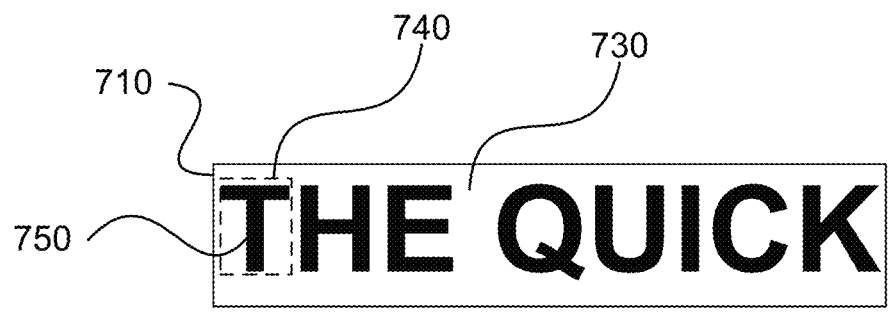
FIGS. 7A and 7B show estimation of spatial frequency of a uniform text region based on character size.
Figure 7B:
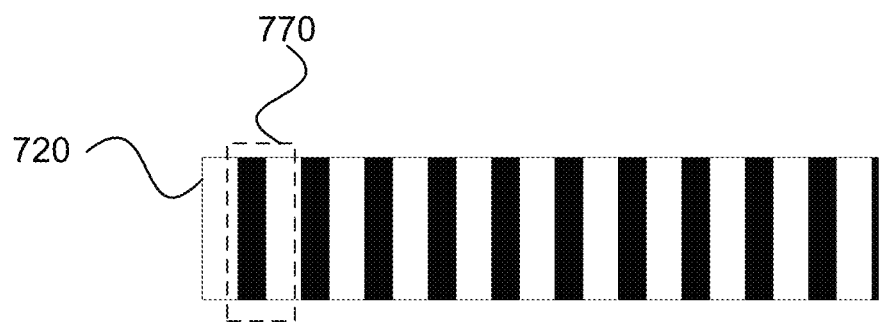

Operation of step 230 is described with reference to FIGS. 7A and 7B. FIG. 7A shows a region 710 including text characters. A spatial frequency 770 of the text characters in the region 710 is shown in FIG. 7B. Referring to FIG. 2, a spatial frequency of the characters in the uniform text region 180 is estimated in execution of step 230. The spatial frequency represents a function of the determined measure of the texture. The spatial frequency relates to a repeating pattern per unit distance in the uniform text block. In determining the spatial frequency, the step 230 effectively operates to determine a distribution of at least one dominant repeating pattern in the textured surface. In arrangements where the textured surface relates to a printed text document, the spatial frequency may relate to a distribution of a most frequently occurring text character size in the printed text.

In the example of FIG. 7B, the spatial frequency 770 represents a dominant repeating pattern in the uniform text block. The spatial frequency 770 is expressed by a number of cycles of alternating dark and light bars 720, as shown in FIG. 7B, per degree of visual angle. In some arrangements, the spatial frequency relates to a number of cycles of alternating light and dark bars in relation to general cycles and/or unit distance.

To determine the spatial frequency, the step 230 executes on the processor 105 to binarize the uniform text region 180 of the document image. Using the binarization process, the region 180 of document image is converted into black and white pixels as shown in the region 710 of FIG. 7A. In the region 710, text characters, such as a character 750, are represented by black pixels, and background is represented by white pixels 730. If the document 170 is a colour document, the document 170 is first converted to grey-scale before applying the binarization step. Once the region 180 is binarized, the step 230 executes to perform connected component analysis on the binary image of the uniform text region 180 such that each textual character in the region 180 is identified as a connected component. A measure of the texture in the area 180, in this instance a size of the textual characters in the region 180 of the document 170, is determined by execution of the application 133. In the example of FIG. 7A, the measure of the texture is determined by estimation of a size of the connected components (in pixels) representing each printed text character.

In other arrangements, the size of each printed text character could be estimated according to a smallest bounding box 740 of a connected component. In other arrangements, a distribution of size of connected components may be determined and a mode of the distribution which represents the most frequently occurring text character size used to estimate the representative size of the text. In the example described in relation to FIGS. 2, 7A and 7B, the spatial frequency 770 of the uniform text region is determined from the estimated size of the characters The method 200 executes on the processor 105 to proceeds from step 230 to step 240. At step 240, the application 133 executes on the processor 105 to determine attributes of the projected text. In determining the attributes of the projected text, the step 240 effectively operates to select a set of glyphs. The attributes of the projected text are determined based on the spatial frequency of the uniform texture surface, in this instance the spatial frequency of the uniform text region 180, determined in step 230. Step 240 executes to select a glyph set (or character set) for the projected text in which each glyph has visually contrasting inner and outer portions. The size of the inner and outer portions of the glyphs (characters) of the projected text is based upon the spatial frequency 770 determined in step 230. The outer portion of each glyph is sized proportionally greater than the inner portion.

Figures 13A, 13B:
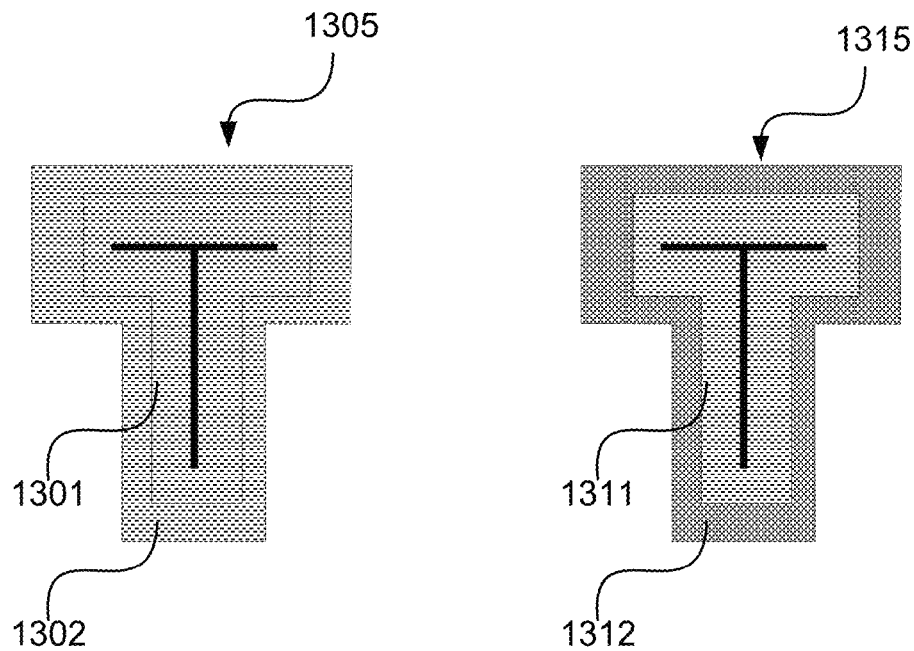
FIGS. 13A to 13C shows inner and outer portions of text with varying visual contrast.
Figure 13C:
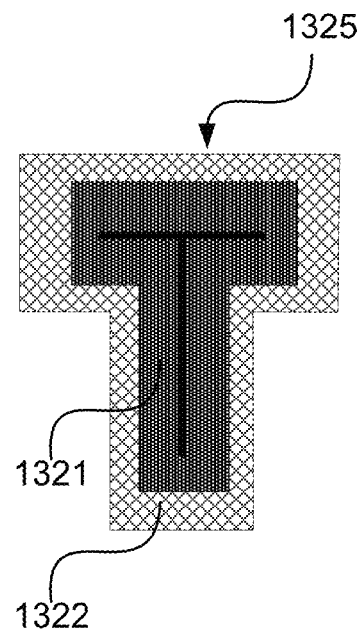

The visual contrast required between the inner and outer portions may be determined according to a predetermined threshold in some arrangements. An example of a non-visually contrasting inner and outer portions is shown in a glyph or character 1305 in FIG. 13A. The glyph 1305 has an inner portion 1301 that has the same fill as an outer portion 1302. Similarly, an example of a low-contrasting inner and outer portion is shown in a glyph 1315 in FIG. 13B. The glyph 1315 has an inner portion 1311 that has a visually very similar fill to an outer portion 1312. An example of a glyph having visually contrasting inner and outer portions is shown as glyph 1325 in FIG. 13C. An inner portion 1321 of the glyph 1325 has a fill that is visually different and contrasting in comparison to an outer portion 1322.

Figure 4:
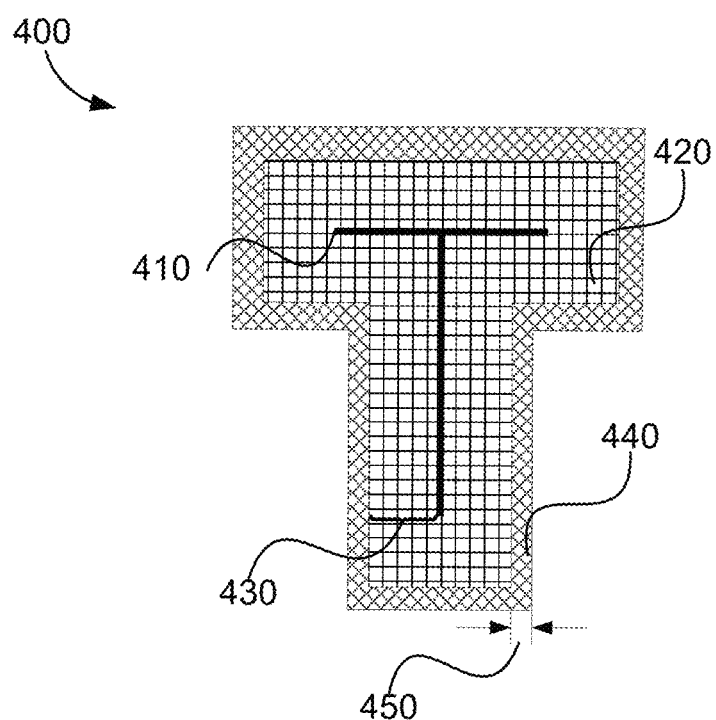
FIG. 4 is a diagram showing a text having inner and outer portions.

Referring to FIG. 4, a letter "T" 400 forms an example of a glyph of the projected text formed using the selected glyph set. The projected text represents a glyph "T" 410. The projected text is rendered with an inner portion 420 and an outer portion 440. In FIG. 4, a size 430 of the inner portion 420 is shown. The outer portion 440 has a size 450. The respective sizes 430 and 450 of the inner and outer portions 420 and 440 of the projected text is chosen such that a spatial frequency of the projected text is similar to the spatial frequency 770 of the uniform text region 180. In other arrangements, the outer portion may be sized relative to the inner portion based upon or according to the spatial frequency. For example, the outer portion may be sized proportionally to the inner portion based upon the spatial frequency. Alternatively, the outer portion may be sized in relation to the inner portion in relation to the spatial frequency or a function of the spatial frequency. In other arrangements, a colour of each of the inner and outer portions 420 and 440 is selected such that the projected text has contrasting sharp edges. The contrasting sharp edges may be selected to alternate at a spatial frequency similar to that of the spatial frequency 770 of the underlying printed text in the region 180. Projecting text with such characteristics has the effect of suppressing the background texture for a user viewing the projection. In selecting a glyph set to allow text attributes which suppress the background texture from the point of view of the user, the method 200 operates to reduce distraction and enhance readability and legibility.

The text projection method 200 executes on the processor 105 to proceed from step 240 to a creation step 250. In execution of the step 250 on the processor 105, text with the attributes of the selected glyph set at step 240 is created. A typical graphics system executing on the processor 105 forms text characters out of individual glyphs. One typical type of glyph is known as path-glyphs. Path-glyphs are described in a vector format, formed of points that ultimately form a path. The formed path is often referred to as a centre-line path.

Figure 6A:
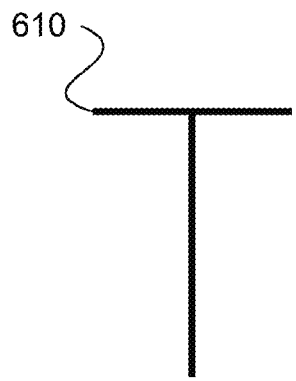
FIGS. 6A to 6D show creation of a text character for projection.
Figure 6B:
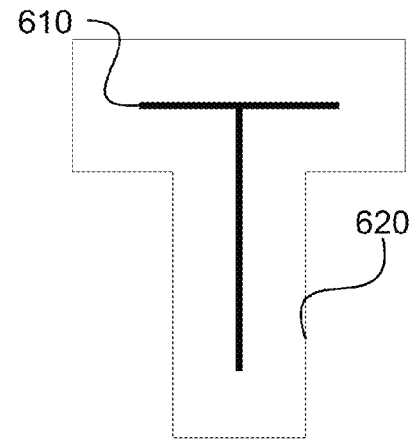

Creation of text at step 250 is described using the example of FIGS. 6A to 6D. FIG. 6A shows a representation of a centre-line path 610 representing an individual glyph for the letter "T". To display the glyph for the letter "T", the graphics system strokes the centre-line path 610 of path-glyphs with necessary caps, joins and widths to produce an outline 620, as shown in FIG. 6B. The graphics system proceeds to fill the outline 620 with a brush. Typical brush fills may be a solid colour, a blend, an image, or a pattern and the like. The brush fill of the selected set of glyphs is such that the brush used for an inner filled-outline 630 (FIG. 6C) and an outer filled-outline 640 (FIG. 6D) form visually contrasting portions of each glyph. For example the brush-fills of the inner and outer filled-portions may use visually contrasting colours or patterns. The inner filled-outline 630 and the outer filed-outline 640 represent inner and outer portions of the glyph 610 respectively.

Figure 6C:
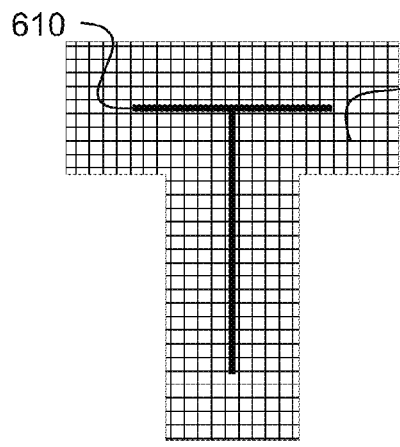
Figure 6D:
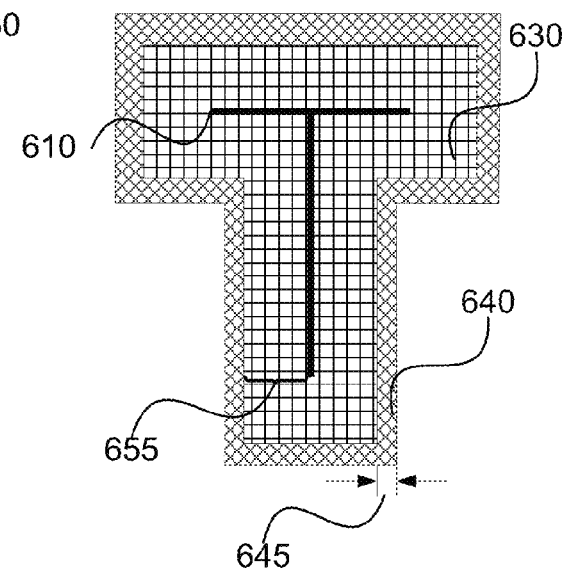

A filled stroked outline is shown as the filled-outline 630 of FIG. 6C. In one arrangement, the projected text characters are generated by double-stroking the centre-line path 610 of the glyph. Referring to FIG. 6D, the double-stroking is completed such that a distance 645 between the inner filled-outline 630 and the outer filled-outline 640 is based on the attributes (e.g. spatial frequency) of the projected text determined in step 240. In other arrangements, a distance 655 between the inner filled-outline 630 and the centre-line path 610 is varied according to the determined attributes of the projected text instead of, or in addition to, the distance 645. The filled-outlines 630 and 640 represent the inner and outer portions respectively.

In determining text attributes and creating text characters, the steps 240 and 250 effectively operate to select a glyph set in which each glyph has visually contrasting inner and outer portions.

The text projection method 200 executes on the processor 105 to proceed from step 250 to step 260. In execution of step 260, the application 133 executes to project text characters created at step 250 using the selected glyph set on the region 180. The application 133 executes on the processor to communicate projection data for the text characters to the projector 169.

Figure 5:
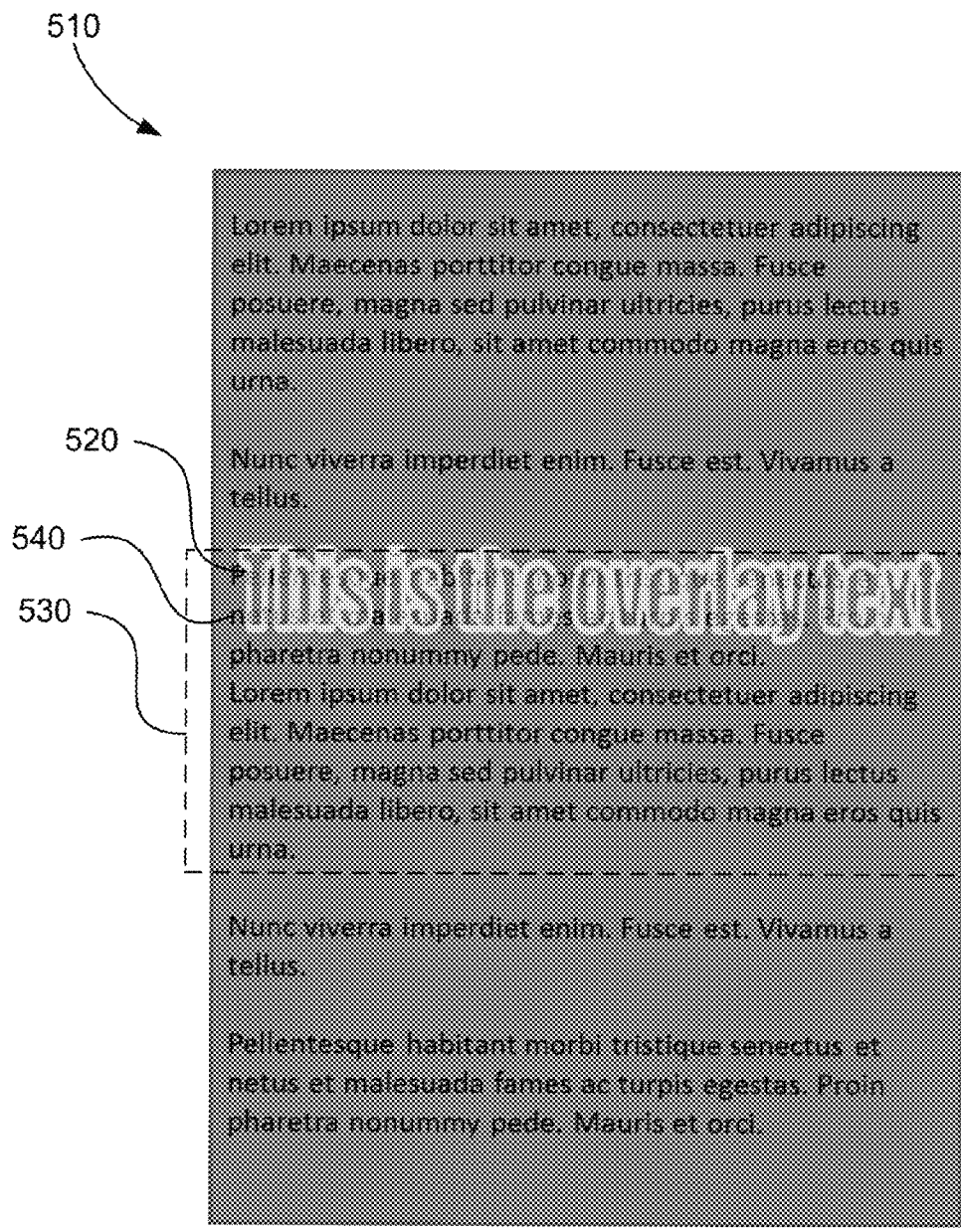
FIG. 5 is a diagram showing text projected on a printed text document.

FIG. 5 shows an example output generated by execution of the method 200 on the processor 105. An area 510 represents an image of a scene captured by the camera 127 at step 210. The area 510 comprises at least one text region 530. The region 530 contains uniform text, identified in execution of step 220. Projected text 520 is projected on the text region 530 according to operation of the method 200 described above in relation to steps 230, 240, 250 and 260. The projected text 520 comprises visually contrasting outer and inner portions. The contrasting inner and outer portions of the text 520 allow a user of the augmented reality system 100 to read the projected text 520 while minimising the distraction caused to the user by background text 540. In minimising distraction caused by the background text 540, the projected text 520 enhances the user experience.

An example of a situation where a need arises for projecting text on a textured surface is an augmented reality translation application. In such an application, the text of the textured region 530 is translated to another language, and text of the translation is projected as the text 520. In such applications, drawing attention of the user away from the background textual region 530 is advantageous. The attention of the user may be focused on the projected text 520 by using projected text 520 which suppresses background text of the region 530 by using a pattern of contrasting colours at a similar spatial frequency as the background text. The arrangements described above relate to an example of a textual background. The arrangements described above may also be practised when text is projected on a non-textual background, such as a textured surface or background. Such backgrounds can occur in diverse real-life situations, for example projecting text on a piece of fabric, for example, projecting a price on a shirt, dress or a carpet. Implementation of such an arrangement is described with reference to FIGS. 8A to 8D. The implementation described in relation to FIGS. 8A to 8D uses a modified version of the method 200.

FIG. 8A shows a region 810 of an image of a textured surface. Such a textured surface has a varying degree of texture, and may appear in fabrics (such as a shirt, a dress and the like), carpets or surfaces such as table top with a characteristic wood grain, wall paper and the like. For example, in a retail outlet, projection may be used to display a discount or a price of an item such as a carpet or a piece of clothing. In such situations, legibility of the projected text may be compromised due to the textured nature of the surface on which the text is being projected. The steps 220 and 230 of the method 200 can be suitably modified to adapt to a textured surface.

Figure 14:
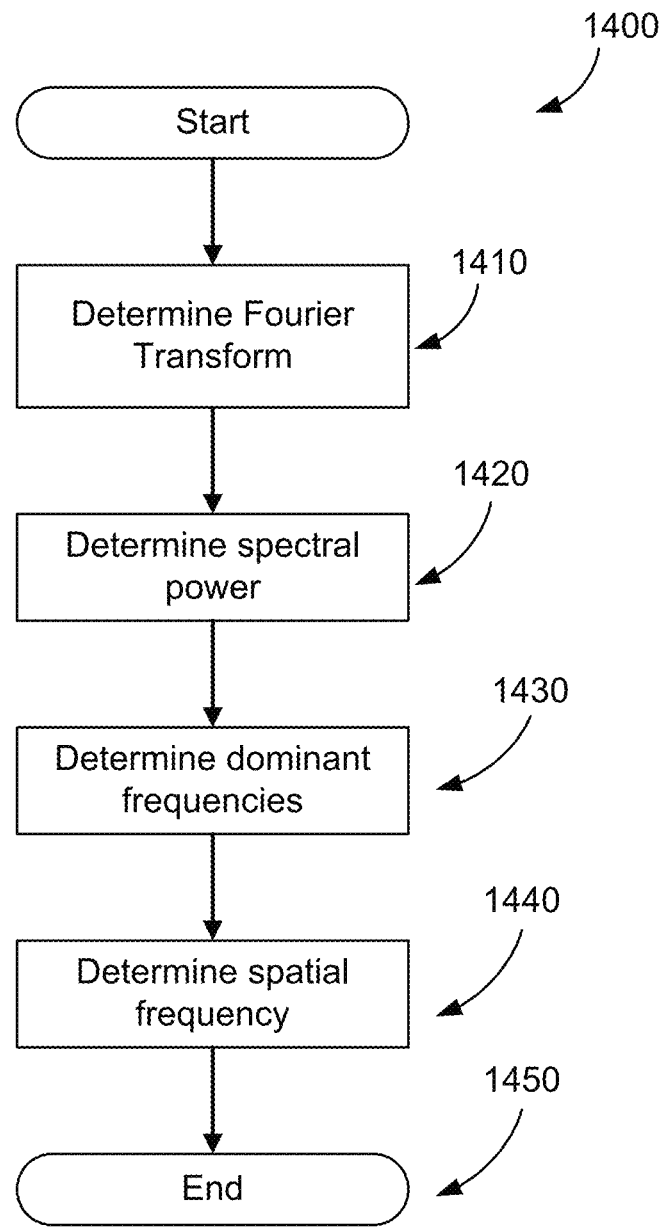
FIG. 14 shows a schematic flow diagram which describes determining spatial frequency based on Fourier analysis of a textured surface.

FIG. 14 shows an example where steps 220 and 230 are modified for projection on a textured surface. FIG. 14 shows operation of a method 1400. The method 1400 replaces steps 220 and 230 of the method 200. The method 1400 may be implemented as one or more submodules of the method 200, and controlled by execution of the processor 105.

As shown in FIG. 14, steps 220 and 230 are modified to determine a Fourier transform of the textured region 810 to determine the characteristics of projected text 830 (FIGS. 8C and 8D). The method 1400 starts at execution of step 1410. In execution pf step 1410, a Fourier transform of the textured region 810 is determined. The Fourier transform represents a measure of the texture of the region 810. Referring back to FIG. 8A, a Fourier transform is determined for the textured region 810 in a direction of flow 850 of projected text. The method 1400 executes to progress from step 1410 to step 1420. At execution of step 1420, a power of the individual frequency bins is determined from the Fourier transform as a square of the magnitude of the Fourier transform.

The method 1400 executes to progress from step 1420 to step 1430. At execution of step 1430, the power of the individual frequency bins is used to determine a dominant frequency or a set of dominant frequencies. The dominant frequency is the frequency which has a highest peak in magnitude.

The method 1400 executes to progress from step 1430 to step 1440. At execution of step 1440, a spatial frequency 820 is determined, as shown in FIG. 8B. The dominant frequency or a set of dominant frequencies may be used to determine the spatial frequency 820 (FIG. 8B) of the textured region 810. In one implementation, a dominant frequency may be used as the spatial frequency. In another implementation, an average spatial frequency may be determined based on a set of dominant frequencies. In a further implementation, an average spatial frequency may be computed as a weighted average of the dominant frequencies where the weighting is based on the magnitudes of the individual frequencies in the dominant frequency set. Upon execution of step 1440, the method 1400 ends.

The method 200 proceeds to step 240 to determine attributes of the projected text based upon the spatial frequency 820. The step 240 executes as described above. The method 200 proceeds to step 250 to create text with the determined projected text attributes.

A resultant created text string 830 is shown in FIG. 8C. FIG. 8D shows a projection scene 840 including the text string 830 projected on the region 810. The test string 830 comprises contrasting inner and outer portions. As can be seen from the scene 840, the projected text string 830 effectively hides the textured background of the area 810 under the text 830. The projected text 530 thus reduces the distraction caused by the textured surface of the region 810, and enhances the user experience.

In another implementation, the steps 220 and 230 of the method 200 are modified to estimate spatial frequencies in two mutually perpendicular directions, for example horizontal and vertical directions, where one of the directions is the direction of flow of projected text. Such is described in relation to FIGS. 10A and 10B.

Figure 10A:
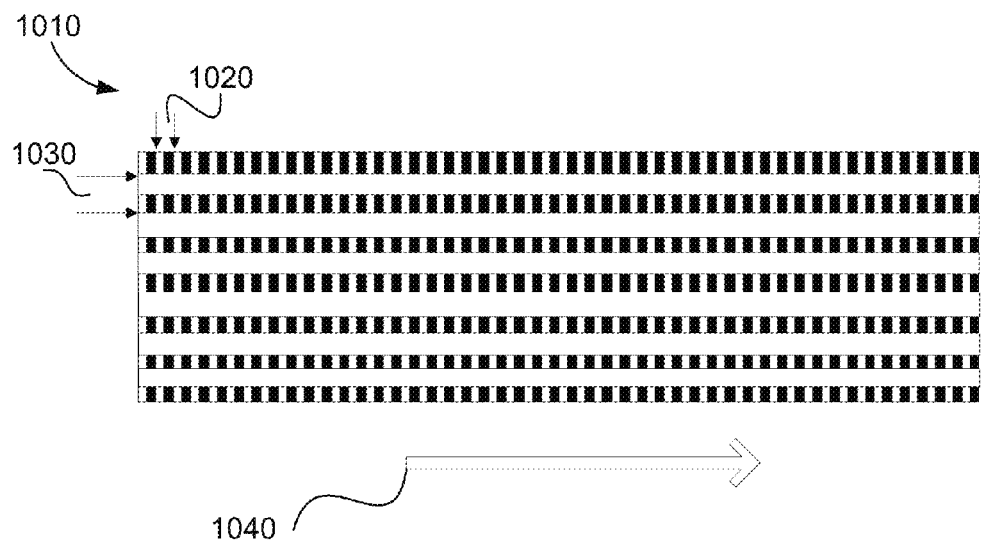
FIGS. 10A and 10B show creation of a glyph for projection based on a horizontal and vertical spatial frequency.

A direction 1040 provides a direction of flow of projected text in FIG. 10A. Referring to FIG. 10A, a region 1010 of an image has a textured surface with a horizontal spatial frequency 1020. The horizontal spatial frequency 1020 is greater than a vertical spatial frequency 1030 of the region 1010. In such implementations, the step 240 is modified such that the distance 645 between the inner filled-outline 630 and the outer filled-outline 640 is varied in accordance with each direction (both the horizontal spatial frequency 1020 and the vertical spatial frequency 1030).

Figure 10B:
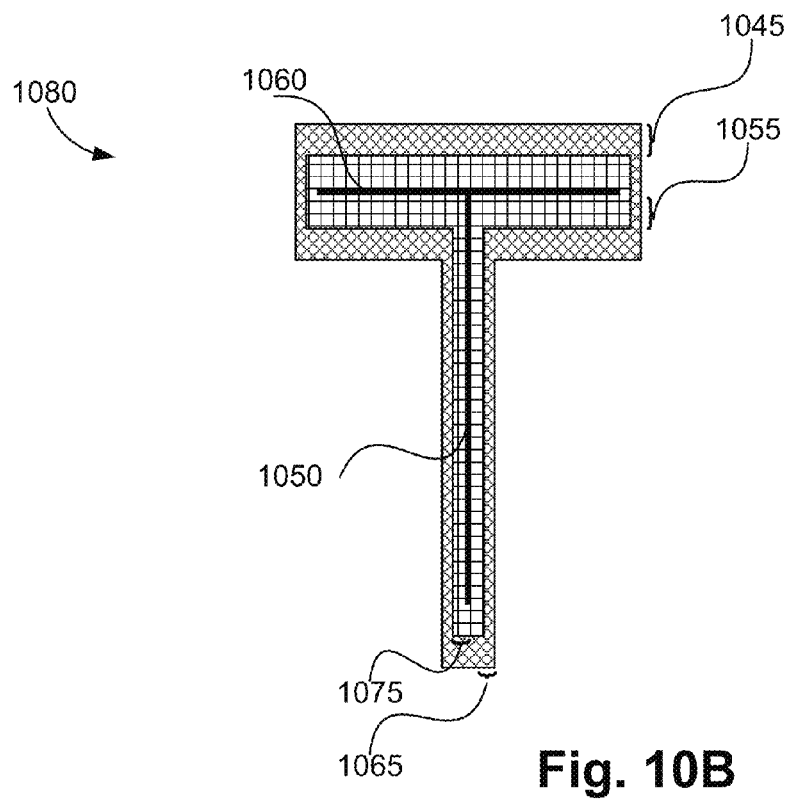

FIG. 10B shows a glyph 1080 for a character "T" determined for the region 1010. In FIG. 10B, characteristics of a vertical stem 1050 of the glyph 1080 are determined according to the horizontal spatial frequency 1020. Similarly, characteristics of a horizontal stem 1060 are determined according to the vertical spatial frequency 1030. The glyph 1080, in a similar fashion to FIGS. 6A to 6D, has a centre-line path. The centre-line path in this example corresponds to the horizontal stem 1060. The centre-line path has been double-stroked with an inner filled-outline, and an outer filled-outline. At least one of vertical distances 1045 and 1055 varies according to the vertical spatial frequency 1030. Similarly, at least one of horizontal distances 1065 and 1075 varies according to the horizontal spatial frequency 1020.

Figure 9A:
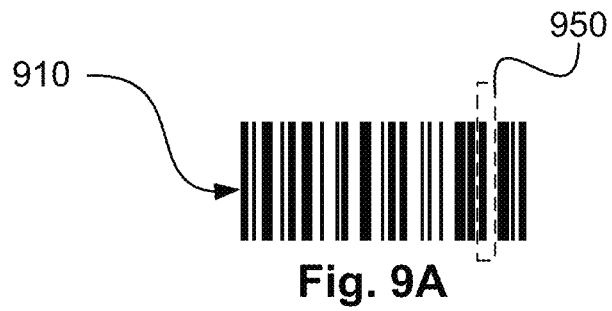
FIGS. 9A to 9D show projection of text characters on a barcode.
Figure 9B:
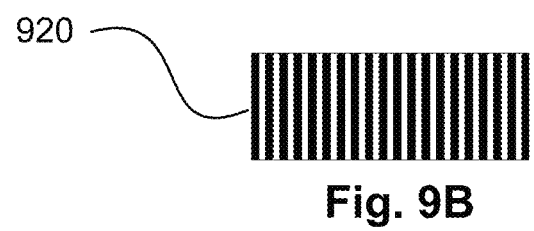

The arrangements described can also be practised for projection of text on to a structured textured surface, such as on to a barcode. FIG. 9A shows a typical barcode 910, formed of a series of dark stripes over a lighter background, such as a black and white pair 950. It may sometimes be beneficial to project text on a surface such as the barcode 910. For example, a vendor may project a price of an item represented by the barcode. In such instances, legibility of the projected text may be compromised due to the nature of the alternating black and white stripes on which the text is being projected. The arrangements described herein can be advantageous for implementing projection in such situations. Such an arrangement is described with reference to FIGS. 9A to 9D. The arrangement described with reference to FIGS. 9A to 9B uses a modification of the method 200.

The steps 220 and 230 of the method 200 are modified for projection of text on to a barcode background. Each of the steps 220 and 230 execute to determine a measure of the texture by determining a size of the black and white stripes. A spatial frequency 920 (FIG. 9B) of the barcode 910 may be relate to an average width of the consecutive black and white pairs such as the pair 950.

Figure 9C:
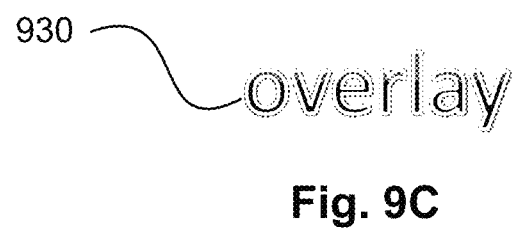
Figure 9D:
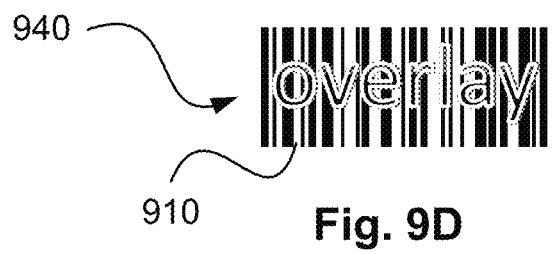

The method 200 executes to determine attributes of the projected text, as at step 240, based upon the spatial frequency 920. The method 200 executes on the processor 105 to progress to create text using the determined attributes, at step 250. A resultant created text string 930 is shown by FIG. 9C. A resultant scene 940 of projecting the text string 930 on to the barcode in 910 is shown in FIG. 9D. As can be seen from the scene 940, the projected text 930 effectively hides the barcode 910 under the projected text 930, effectively reducing distraction caused by the barcode 910 to the user to enhance the user experience.

Figure 11A:
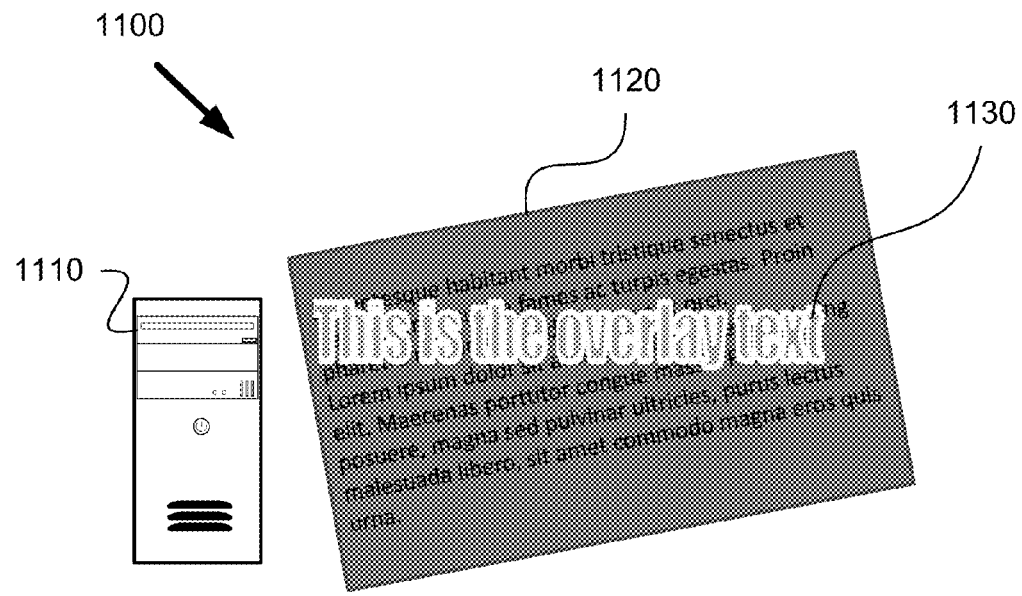
FIGS. 11A and 11B show creation of text for projection which is not aligned with a background textured surface.
Figure 11B:
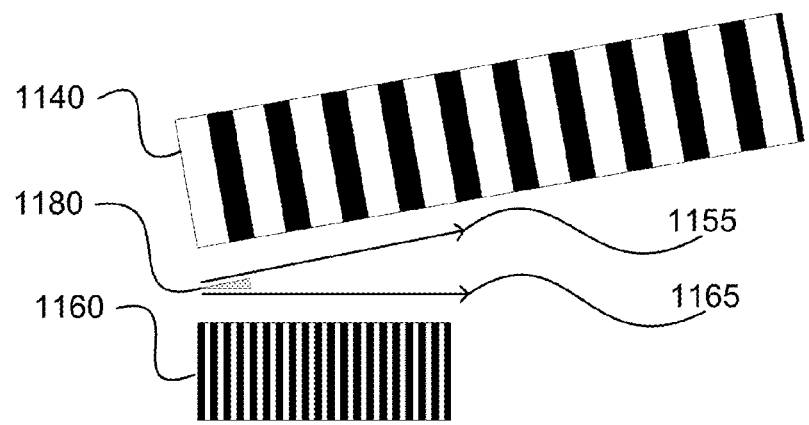

This arrangements described can also be practised in a situation where the background texture is in a different orientation to the projected text. An example of such an implementation is described with reference to FIGS. 11A and 11B. In FIG. 11A, an object 1110 and an adjacent document 1120 form part of a scene captured by the camera 127. The document 1120 has a different orientation to the object 1100. The projection-based augmented reality system 100 operates to project text 1130 next to the object 1110 such that the projected text is aligned in a same orientation as the object 1110. The projected text forms a scene 1100 as shown in FIG. 11A FIG. 11B represents a comparison between a spatial frequency 1140 of the background text 1120 in orientation to a spatial frequency 1160 of the projected text 1130. The orientation of the spatial frequency 1140 is represented by a vector 1155.

The method 200 as described in relation to FIG. 2 is executed to determine characteristics of, and project, the text 1130. In the example shown in relation to FIGS. 11A and 11B, the step 240 of the method 200 is modified. The step 240 is modified to execute to determine the resultant component 1165 of the vector 1155. The component 1165 is representative of the direction of flow of the projected text 1130. Further, the step 240 of the method 200 in such an instance executes to determine a translated spatial frequency 1160 of the background text 1120 in the direction of the vector 1165. In such arrangements, the step 240 effectively translates the spatial frequency from the orientation of the texture to the orientation of the projected text for selection of the glyph set The translated spatial frequency 1160 of the spatial frequency 1140 is used to determine the attributes of the projected text 1130 in execution of the step 240. Referring to FIG. 11B, an angle 1180 between vectors 1155 and 1165 is used to determine the translated spatial frequency component 1160. In one arrangements, the cosine of the angle 1180 is used to translate the spatial frequency and determine the attributes of the projected text 1130 in execution of step 240.

Referring to FIGS. 6C and 6D, one of the advantages of the arrangements described herein is that projected text having the inner filled-outline 630 and the larger outer filled-outline 640 with contrasting colours produces an alternating pattern of light and dark colours which assists in suppressing the background text from the attention of the user.

Figure 12A:
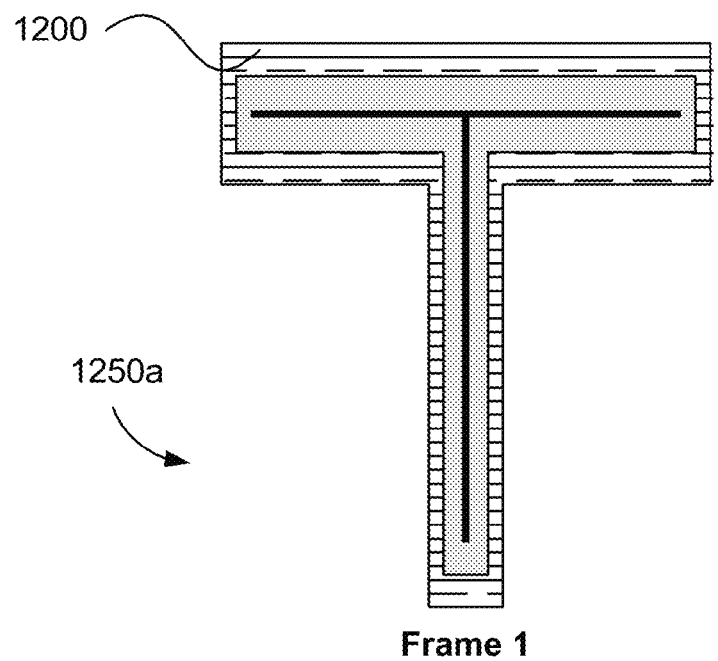
FIGS. 12A and 12B show instances of a text character for projection with an animated outer filled-outline.
Figure 12B:
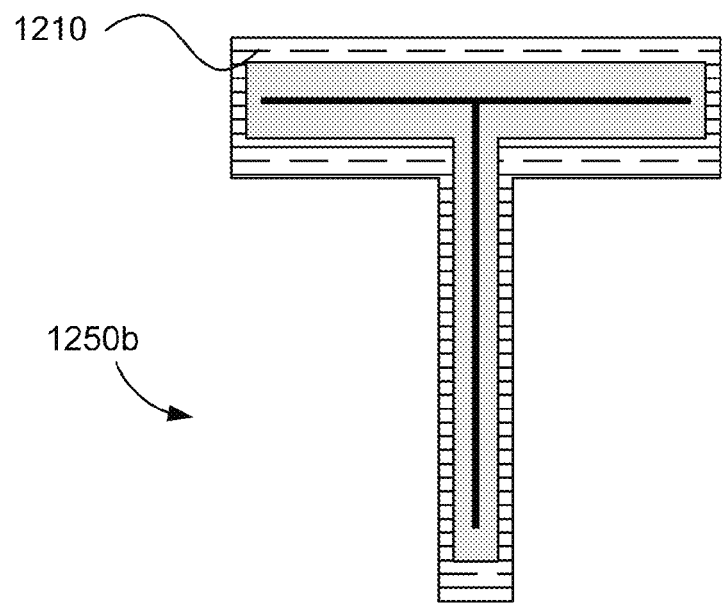

In some arrangements, the effect of alternating light and dark colours is further enhanced by simulating an effect of animation in either the inner filled-outline 630 or the outer filled-outline 640 of the projected text. In such arrangements one of the inner and outer portions of the glyph set comprises an animation pattern. An example of such an implementation is described with reference to FIGS. 12A and 12B. In FIGS. 12A and 12B, outer filled-outlines 1200 and 1210, of characters 1250a and 1250b respectively, represent snapshots of a projected text character at two consecutive time intervals. The filler-outline 1200 has a different width to the filled-outline 1210.

The method 200 as described in relation to FIG. 2 is used to generate the text of FIGS. 12A and 12B. The method 200 executes steps 210 through 240 as described in relation to FIG. 2. Step 250 of the method 200 is modified to use an animation to fill a pattern for the outer filled-outline according to a determined rate of variation. The animation fills a pattern which varies with time in execution of the step 250 as used for FIGS. 12A and 12B.

In one arrangement, the rate at which the pattern is varied is derived from the spatial frequency of a region of the background texture. The region may be, for example, a uniform text region (such as the region 540) or a region of any arbitrary textured surface (such as the texture of the area 810). In other arrangements, the pattern filled by the time-varying brush is inversely proportional to the spatial frequency of the background. In other arrangements, the fill created by the animation simulates an apparent movement of the pattern in a direction of the flow of the projected text. The animation is effectively a time-varying pattern to create an illusion of motion in the direction of flow of the projected text. The illusion of motion operates to further draw the user's attention to the projected text rather than the background.

The arrangements described are applicable to the projection industries. As described above, selection of the glyph set having visually contrasting inner and outer portions based upon the spatial frequency of the texture assists in suppressing the background texture. In selecting a set of glyphs having visually contrasting inner and outer portions based on the spatial frequency, the application 133 further operates to determine a minimum size font required to suppress the texture during projection of text characters.

The foregoing describes only some embodiments, and modifications and/or changes can be made thereto without departing from the scope and spirit of the disclosure, the embodiments being illustrative and not restrictive.

In the context of this specification, the word "comprising" means "including principally but not necessarily solely" or "having" or "including", and not "consisting only of". Variations of the word "comprising", such as "comprise" and "comprises" have correspondingly varied meanings.

The invention claimed is:

1. A method of projecting text characters onto a textured surface, the method comprising:
   determining, from a captured image of the textured surface, a measure of the texture on the surface for a region of the textured surface over which the text characters are to be projected;
   selecting, based on a function of the determined measure, a glyph set, each glyph in the glyph set having visually contrasting inner and outer portions, at least one of the inner and outer portions having a width varied according to the determined measure in each of two mutually perpendicular directions, the outer portion being sized proportionally to the inner portion according to the determined measure; and
   projecting the text characters onto the textured surface of the region using the selected glyph set.

2. The method according to claim 1, wherein the function of the determined measure is a spatial frequency, the spatial frequency relating to a distribution of at least one dominant repeating pattern of the texture.

3. The method according to claim 2, wherein the textured surface comprises a printed text surface, and the spatial frequency relates to a distribution of a most frequently occurring character size of the printed text.

4. The method according to claim 2, wherein the textured surface comprises a barcode, and the spatial frequency relates to an average width of stripes of the barcode.

5. The method according to claim 2, wherein the inner portion and outer portions form contrasting sharp edges in the projected text characters, the sharp edges having a dominant repeating pattern similar to the spatial frequency.

6. The method according to claim 1, wherein the inner and outer portions form contrasting sharp edges in the projected text characters.

7. The method according to claim 1, wherein the inner portion and the outer portion comprise at least one of a contrasting colour and a contrasting pattern.

8. The method according to claim 1, wherein the measure is determined based upon a Fourier transform of the texture.

9. The method according to claim 8, wherein the function of the determined measure relates to a dominant frequency determined from the Fourier transform.

10. The method according to claim 1, wherein the texture has a different orientation to an orientation of the projected text, the measure being determined in relation to the orientation of the texture.

11. The method according to claim 10, wherein the function of the determined measure is translated from the orientation of the texture to the orientation of the projected text for selection of the glyph set.

12. The method according to claim 1, wherein at least one of the inner portion and the outer portion comprises an animation pattern.

13. The method according to claim 12, wherein the pattern is varied proportionally to the function of the determined measure.

14. The method according to claim 12, wherein the pattern is varied inversely proportionally to the function of the determined measure.

15. The method of claim 12, wherein the pattern simulates movement in a direction of flow of the projected text.

16. A non-transitory computer readable medium having a computer program stored thereon for projecting text characters onto a textured surface, the computer program comprising:
   code for determining, from a captured image of the textured surface, a measure of the texture on the surface for a region of the textured surface over which the text characters are to be projected;
   code for selecting, based on a function of the determined measure, a glyph set, each glyph in the glyph set having visually contrasting inner and outer portions, at least one of the inner and outer portions having a width varied according to the determined measure in each of two mutually perpendicular directions, the outer portion being sized relative to the inner portion based upon the determined measure; and
   code for projecting the text characters onto the textured surface of the region using the selected glyph set.

17. A system for projecting text characters onto a textured surface, the system comprising:
   a memory for storing data and a computer program;
   a processor coupled to the memory for executing said computer program, said computer program comprising instructions for:
      determining, from a captured image of the textured surface, a measure of the texture on the surface for a region of the textured surface over which the text characters are to be projected;
      selecting, based on a function of the determined measure, a glyph set, each glyph in the glyph set having visually contrasting inner and outer portions, at least one of the inner and outer portions having a width varied according to the determined measure in each of two mutually perpendicular directions, the outer portion being sized in relation to the inner portion according to the determined measure; and projecting the text characters onto the textured surface of the region using the selected glyph set.

18. An apparatus for projecting text characters onto a textured surface, the apparatus comprising:
 means for determining, from a captured image of the textured surface, a measure of the texture on the surface for a region of the textured surface over which the text characters are to be projected;
 means for selecting, based on a function of the determined measure, a glyph set, each glyph in the glyph set having visually contrasting inner and outer portions, at least one of the inner and outer portions having a width varied according to the determined measure in each of two mutually perpendicular directions, the outer portion being sized proportionally to the inner portion based upon a function of the determined measure; and
 means for projecting the text characters onto the textured surface of the region using the selected glyph set.

\* \* \* \* \*